(12) United States Patent
Hirayama

(10) Patent No.: US 7,856,179 B2
(45) Date of Patent: Dec. 21, 2010

(54) IMAGE STABILIZATION CONTROL CIRCUIT AND IMAGE-CAPTURING DEVICE

(75) Inventor: Hideki Hirayama, Ampachi-Gun (JP)

(73) Assignees: Sanyo Electric Co., Ltd., Moriguchi (JP); Sanyo Semiconductor Co., Ltd., Ora-gun (JP)

( * ) Notice: Subject to any disclaimer, the term of this patent is extended or adjusted under 35 U.S.C. 154(b) by 0 days.

(21) Appl. No.: 12/591,259

(22) Filed: Nov. 13, 2009

(65) Prior Publication Data

US 2010/0124411 A1 May 20, 2010

(30) Foreign Application Priority Data

Nov. 18, 2008 (JP) ............................. 2008-294347

(51) Int. Cl.
*G03B 17/00* (2006.01)
*H04N 5/228* (2006.01)
(52) U.S. Cl. ................................. 396/55; 348/208.99
(58) Field of Classification Search .................. 396/55; 348/208.99
See application file for complete search history.

(56) References Cited

U.S. PATENT DOCUMENTS 4,553,133 A * 11/1985 Peterson et al. ............... 341/78
4,608,554 A * 8/1986 Blair ........................... 341/75
6,965,397 B1 * 11/2005 Honey et al. ............. 348/208.2
2008/0174663 A1 * 7/2008 Iwabuchi .................. 348/208.6
2010/0013937 A1 * 1/2010 Washisu et al. .......... 348/208.2

FOREIGN PATENT DOCUMENTS

JP   A-2002-246913   8/2002

* cited by examiner

*Primary Examiner*—Rodney E Fuller
(74) *Attorney, Agent, or Firm*—Oliff & Berridge, PLC

(57) ABSTRACT

An image stabilization control circuit of an image-capturing device prevents overflow of data in an integration process performed in a digital signal process on a signal outputted by a gyro-sensor. A gyro-filter receives, as an input, fixed-point format angular velocity data ($D_\omega$) obtained by subjecting an output signal from the gyro-sensor to an analog-to-digital conversion. In the gyro-filter, an input format conversion circuit converts from fixed-point format to floating-point format. A camera shake vibration component is obtained from the floating-point format $D_\omega$, is integrated, and data ($D_\theta$) corresponding to an oscillation angle is generated. After a centering process is performed, $D_\theta$ is converted from floating-point format to fixed-point format by an output format conversion circuit, and outputted from the gyro-filter. A drive signal for driving an image stabilization mechanism is generated on the basis of the data outputted by the gyro-filter.

7 Claims, 3 Drawing Sheets

IMAGE STABILIZATION CONTROL CIRCUIT AND IMAGE-CAPTURING DEVICE

CROSS-REFERENCE TO RELATED APPLICATION

The priority application number JP 2008-294347 upon which this patent application is based is hereby incorporated by reference.

BACKGROUND OF THE INVENTION

1. Field of the Invention

The present invention relates to an image stabilization control circuit for driving an image stabilization mechanism provided in order to compensate for camera shake or other types of vibration in an image-capturing device such as a digital still camera, and to an image-capturing device using the control circuit.

2. Description of the Related Art

Current image-capturing devices are often provided with a camera shake correction function in order to minimize a decline in picture quality due to camera shake. Many types of camera shake correction methods exist. In one of the methods, vibration of the image-capturing device is detected by a vibration detector, and an optical component such as a correction lens, or an image sensor such as a CCD image sensor, is displaced by an actuator on the basis of the detected signal. The vibration detector employs a gyro-sensor and detects angular velocity that corresponds to the change in the direction of the optical axis. The degree to which the lens or other component is displaced is used to drivably control the actuator. Therefore, the image stabilization control circuit for generating the drive signal of the actuator performs a process whereby the angular velocity or other type of displacement velocity obtained from the vibration detector is integrated and converted to the displacement magnitude.

More particularly, the process for obtaining the displacement magnitude involves performing a camera shake component extraction process to remove frequency components below the region of camera shake vibration frequencies from the angular velocity signal outputted from the gyro-sensor, and using integration to convert the angular velocity into a displacement magnitude corresponding to an angle. In the process for obtaining the displacement magnitude, by damping the output signal of the integration process or by other means, a centering process is also performed to establish the displacement magnitude so that it is made more difficult for the lens or the like to reach the movability limit. The processor for generating the output corresponding to the displacement magnitude on the basis of the output signal of the gyro-sensor is herein referred to as a gyro-filter.

The function of a gyro-filter is conventionally achieved using software for which a microprocessor is used. A problem presented with such a configuration is that more power is consumed when the frequency of the clock for driving the microprocessor is increased to make the image stabilization more responsive. Addressing this problem by using a digital filter circuit instead of a microprocessor as the gyro-filter makes it possible to decrease power consumption.

The gyro-sensor outputs an analog signal corresponding to the displacement velocity. The analog signal is converted to fixed-point format digital data by an analog-to-digital converter (ADC), and fed to the gyro-filter. The vibration compensation data outputted by the gyro-filter as a computational result is used to generate the drive signal of the actuator. The drive signal is generated using, for example, a digital-to-analog converter (DAC) or a pulse width modulation (PWM) circuit. A DAC or PWM circuit that receives fixed-point format data as an input is used for the sake of structural simplicity and other reasons. Specifically, the gyro-filter receives displacement velocity in a fixed-point format, and outputs vibration compensation data in a fixed-point format. For this reason, calculations within the gyro-filter can also be performed substantially in fixed-point format.

SUMMARY OF THE INVENTION

An integration process is included in the calculations performed in the gyro-filter, and a problem is presented in that the calculations performed in fixed-point format readily create an overflow in the integration process. Solutions devised in response to this problem such as multiplying the gain with a multiplier so as to reduce the data, or performing a process known as data culling, create problems by complicating the circuit structure of the digital filter. Even if it is possible to prevent the accuracy of the vibration compensation data from decreasing due to the overflow, the accuracy of the vibration compensation data may still be decreased by the gain being multiplied or the data being culled.

The present invention was devised to solve the above-described problems, and provides an image stabilization control circuit and an image-capturing device that ensure the accuracy of the calculations for determining the vibration compensation data from the displacement velocity data.

The image stabilization control circuit according to the present invention, and the image stabilization control circuit used in the image-capturing device according to the present invention, is an image stabilization control circuit for driving an image stabilization mechanism of an image-capturing device on the basis of a displacement velocity of the image-capturing device detected by a vibration detector provided to the device, and comprises a vibration-compensation-data-generating circuit for generating vibration-compensation data corresponding to a magnitude of displacement of the image-capturing device, on the basis of displacement velocity data corresponding to the displacement velocity; and a drive-signal-generating circuit for generating a drive signal for driving the image stabilization mechanism, on the basis of the vibration-compensation data outputted from the vibration-compensation-data-generating circuit. The vibration-compensation-data-generating circuit comprises an input format conversion circuit for converting the displacement velocity data from fixed-point format to floating-point format; a high-pass filter that is a digital filter for performing a filtering process for damping a low-frequency component and transmitting a vibration component of a target compensation region, on the floating-point format displacement velocity data; an integration circuit that is a digital filter for performing an integration process on data outputted by the high-pass filter, and generating the vibration-compensation data; and an output format conversion circuit for converting the vibration-compensation data obtained by the integration circuit from floating-point format to fixed-point format, and outputting the vibration-compensation data from the vibration-compensation-data-generating circuit.

DESCRIPTION OF THE PREFERRED EMBODIMENTS

An embodiment of the present invention ("embodiment" below) will be described hereinafter with reference to the accompanying drawings. The present embodiment relates to a camera, and the image stabilization control circuit according to the present invention is used in the camera shake correction function of the camera.

Figure 1:
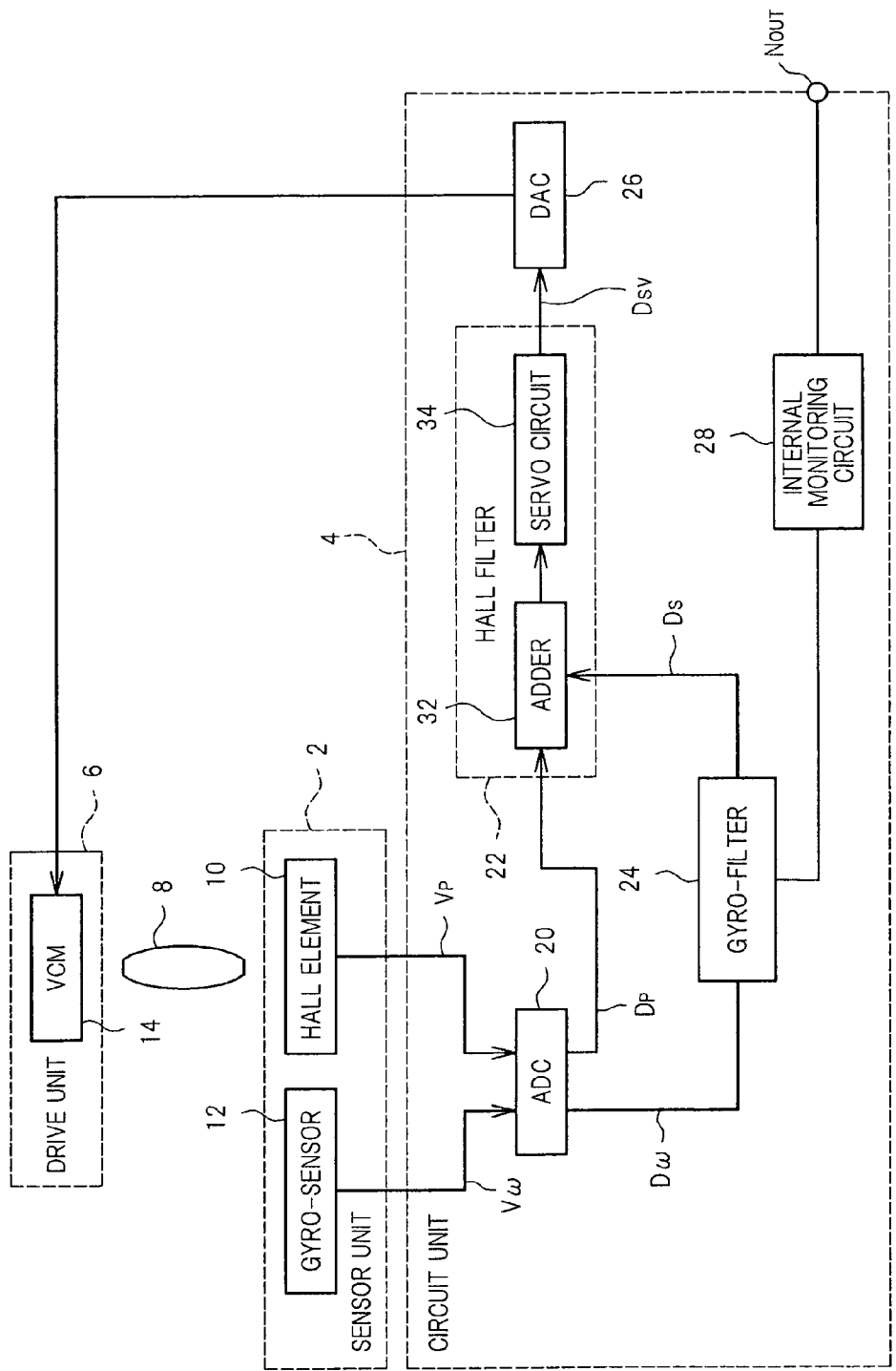
FIG. 1 is a schematic block diagram of an image stabilizing system according to an embodiment of the present invention.

FIG. 1 is a schematic block diagram showing an image stabilizing system according to the embodiment. The image stabilizing system has a sensor unit 2, a circuit unit 4, and a drive unit 6. Several schemes can be used for the image stabilizing system. For example, the present system can operate according to a scheme for controlling the position of a corrective lens (lens 8) provided to an optical system for forming an optical image on a receiving surface of an image sensor (not shown).

The sensor unit 2 comprises Hall elements 10 and gyro-sensors 12. The Hall element 10 is a sensor provided in order to detect the position the lens 8. It generates a voltage signal $V_P$ corresponding to the distance to the lens 8 on the basis of the magnetic field of a magnet fixed to the lens 8, and outputs the signal to the circuit unit 4. In order to detect the two-dimensional position ($P_X$, $P_Y$) of the lens 8 within a plane perpendicular to the optical axis (the x-y plane), the Hall element 10 is provided correspondingly with respect to both the x-direction and the y-direction, and the signal $V_P$ can be obtained in each of the x-direction and the y-direction.

The gyro-sensor 12 is a sensor (vibration detector) provided in order to detect vibration of a camera, and emits to the circuit unit 4 a voltage signal $V_\omega$ corresponding to an angular velocity ω, as a vibration detection signal corresponding to the displacement velocity of the camera. Two gyro-sensors 12 are also provided, and these sensors can obtain the signal $V_\omega$ both for the angular velocity component around the x-axis and for the angular velocity component around the y-axis.

The displaceable lens 8 and the drive unit 6 for displacing the lens 8 constitute an image stabilization mechanism, and the drive power source of the drive unit 6 is composed of, for example, a voice coil motor (VCM) 14. The VCM 14 linearly displaces a moveable coil that constitutes the VCM and controls the position of the lens 8 in accordance with the voltage of the drive signal generated by the circuit unit 4. In order to achieve two-dimensional displacement within the x-y plane, a pair of VCMs 14 is provided, allowing displacement to be made both in the x-direction and in the y-direction.

The circuit unit 4 has an ADC 20, a Hall filter 22, a gyro-filter 24, a DAC 26, and an internal monitoring circuit 28. The circuit unit 4 is composed of a logic circuit, and is formed as, for example, an application-specific integrated circuit (ASIC).

The output signals of the Hall element 10 and the gyro-sensor 12 are inputted to the ADC 20. The ADC 20 converts the voltage signals $V_P$ outputted by the two Hall elements 10 and the voltage signals $V_\omega$ outputted by the two gyro-sensors 12 into fixed-point format digital data on a time-sharing basis. Each of the signals is periodically converted from analog to digital for each servo control cycle.

Position data $D_P$ generated based on the output of the Hall elements 10 is inputted to the Hall filter 22. Angular velocity data $D_\omega$ generated based on the output of the gyro-sensor 12 is inputted to the gyro-filter 24.

The gyro-filter 24 is a circuit for generating vibration-compensating data corresponding to the amount of camera displacement. The filter integrates the angular velocity $D_\omega$ inputted every servo control cycle over a predetermined sampling period, and generates data $D_\theta$ corresponding to a vibration angle θ of the camera around the x-axis and the y-axis. The gyro-filter 24 generates and outputs vibration-compensating data $D_S$ corresponding to the camera shake magnitude in both the x-direction and the y-direction on the basis of the data $D_\theta$. The structure of the gyro-filter 24 will be further described below.

The Hall filter 22 has an adder 32 and a servo circuit 34. The adder 32 adds position data $D_P$ inputted from the ADC 20 and vibration-compensating data $D_S$ from the gyro-filter 24 separately in the x and y directions. The servo circuit 34 calculates servo data $D_{SV}$ that corresponds to the required magnitude of displacement of the lens 8 from the data outputted by the adder 32 both in the x-axis direction and in the y-axis direction.

The DAC 26 converts the servo data $D_{SV}$ outputted from the Hall filter 22 into an analog voltage signal. The voltage signal outputted by the DAC 26 is subjected to a predetermined amplification process and subsequently applied to the VCM 14. The VCM 14 is driven in the direction in which the absolute value of $D_{SV}$ decreases, whereby it is possible to move the lens 8 in a camera provided with the present system in accordance with the camera shake in the image-capturing period, compensate for the shake-induced displacement of the imaged subject on the image element, and obtain a high-quality image signal.

The internal monitoring circuit 28 is a circuit for obtaining internal operation data of the gyro-filter 24 from an output terminal $N_{OUT}$. The circuit is used when the operational state of the gyro-filter 24 is to be monitored externally relative to the circuit unit 4. For example, the internal monitoring circuit 28 is used when characteristics of the digital filter that constitutes the gyro-filter 24 are set, or when a failure analysis is to be performed. The output terminal $N_{OUT}$ outputs, for example, analog signals that vary in accordance with the internal computation data, the signals are fed to an oscilloscope or other signal monitoring device, and any time changes in the internal computation data can be observed as waveforms. The composition of the internal monitoring circuit 28 will be further described below.

Figure 2:
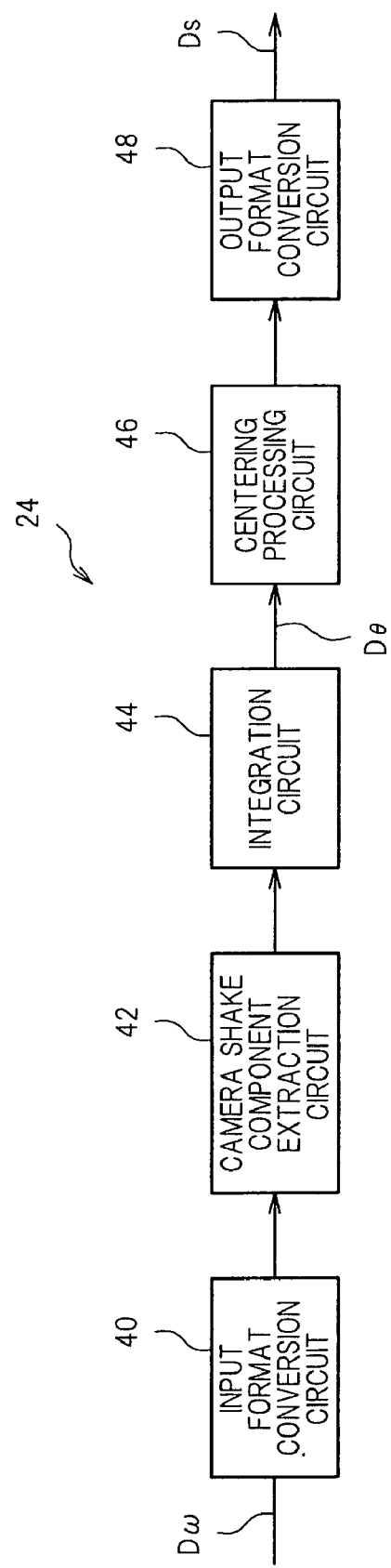
FIG. 2 is a schematic block diagram showing the structure of a gyro-filter according to an embodiment of the present invention.

The structure of the gyro-filter 24 shall now be described. FIG. 2 is a schematic block diagram showing the structure of the gyro-filter 24. The gyro-filter 24 has an input format conversion circuit 40, a camera shake component extraction circuit 42, an integration circuit 44, a centering circuit 46, and an output format conversion circuit 48.

The input format conversion circuit 40 converts the angular velocity data $D_\omega$ received from the ADC 20 from fixed-point format to floating-point format. For example, the input format conversion circuit 40 converts 16-bit fixed-point format data to 32-bit floating-point format data.

The camera shake component extraction circuit 42 is a high-pass filter (HPF). The circuit receives an angular velocity signal composed of time-sequenced angular velocity data $D_\omega$ from the input format conversion circuit 40, damps the low-frequency component contained in the angular velocity signal, and performs a filtering process for transmitting a vibration component of a target compensation region. The target compensation region is set so as to include the frequency region of the vibration caused by camera shake. In response to the fact that the camera shake includes a low frequency; e.g., approximately 2 to 10 Hz, the cutoff frequency of the HPF of the camera shake component extraction circuit 42 is set at, e.g., below 1 Hz. Specifically, the camera shake component extraction circuit 42 performs high-pass filtering for transmitting a component of approximately several Hz while damping a low-frequency component substantially regarded to be a direct-current component, and extracts from the received angular velocity signal a frequency component corresponding to the camera shake. The camera shake component extraction circuit 42 is composed of a digital filter for performing calculations in a floating-point format, and the filter characteristics are set according to a filter factor set in a register (not shown).

The integration circuit 44 integrates the angular velocity signal composed of floating-point data and outputted by the camera shake component extraction circuit 42, and generates the angular velocity signal that is composed of the angular data $D_\theta$ and indicates the magnitude of image-capturing device displacement. The integration circuit 44 can be configured using an LPF, and the LPF is configured by a digital filter for performing calculations in a floating-point format. The filter characteristics are set according to a filter factor set in a register (not shown). The angular data $D_\theta$ generated by the integration circuit 44 indicates the magnitude of image-capturing device displacement as noted above, and can therefore be used as the vibration-compensating data $D_S$ to be fed to the Hall filter 22. The present system further performs a centering process in response to the angular data $D_\theta$ obtained from the integration circuit 44, the results of which process being supplied to the Hall filter 22 as the vibration-compensating data $D_S$.

The centering circuit 46 performs a process for correcting the displacement magnitude so that the lens 8 will not readily reach the movability limit imposed by a vibration-control mechanism. One centering process technique is a method that uses the angular data $D_\theta$ obtained by integration to damp a component regarded to be a direct current component and has a frequency lower than the lower limit of the target compensation region. In this case, the centering circuit 46 can be configured using an HPF. The centering HPF is composed of a digital filter for performing calculations in a floating-point format, and the filter characteristics are set according to a filter factor set in a register (not shown). Strictly speaking, the cutoff frequency of the HPF constituting the centering circuit 46 is set below the lower limit of the target compensation region, as with the abovedescribed HPF constituting the camera shake component extraction circuit 42. As described above, processing results of the centering circuit 46 are employed as the vibration-compensating data $D_S$.

The output format conversion circuit 48 converts the vibration-compensating data $D_S$ received from the centering circuit 46 from floating-point format to fixed-point format, and inputs the vibration-compensating data $D_S$ shown in fixed-point format to the adder 32 of the Hall filter 22.

During the processing that occurs in the gyro-filter 24, data can be generated in a range that cannot be expressed in fixed-point format. For example, the accumulation of direct current components in the integration circuit 44 can cause the integration results to reach a value exceeding the upper limit of what is capable of being expressed by 16-bit fixed-point format data. The direct current components are removed by the centering circuit 46, and the processing results of the centering circuit 46 can be in a range that can be expressed in fixed-point format; however, when overflow develops in the integration circuit 44, the accuracy of the vibration-compensating data $D_S$ outputted from the centering circuit 46 declines. In contrast, the gyro-filter 24 of the present system performs a process for generating the vibration-compensating data $D_S$ from the angular velocity data $D_\omega$, on the basis of data expressed in floating-point format; therefore, data that cannot be expressed in fixed-point format can also be expressed correctly, and highly accurate vibration-compensating data $D_S$ can be obtained on the basis of the correct value.

The gyro-filter 24 uses a digital filter to perform the process for generating the vibration-compensating data $D_S$ from the angular velocity data $D_\omega$. This configuration makes it possible to have a smaller circuit area than a configuration using a microprocessor or the like. It is thereby possible to reduce the cost of the semiconductor chip on which the circuit unit 4 is formed. When the abovementioned floating-point format calculations are performed by a microprocessor, the processor needs to have higher performance than what is required when the calculations are performed in fixed-point format, driving costs up. In contrast, the circuitry in a configuration using a digital filter is on a smaller scale than that in a microprocessor, and therefore the cost increase when using a configuration corresponding to a floating-point format is smaller than that associated with using a microprocessor. Furthermore, there is no need to use a microprocessor or the like to generate the vibration-compensating data $D_S$, and the circuit unit 4 can use less power. Moreover, having the gyro-filter 24 composed of the digital filter makes it possible for the filter factor or other adjustment data to be readily changed. This makes it possible to readily change the setting of the adjustment data corresponding to the design of the image-capturing device.

Figure 3:
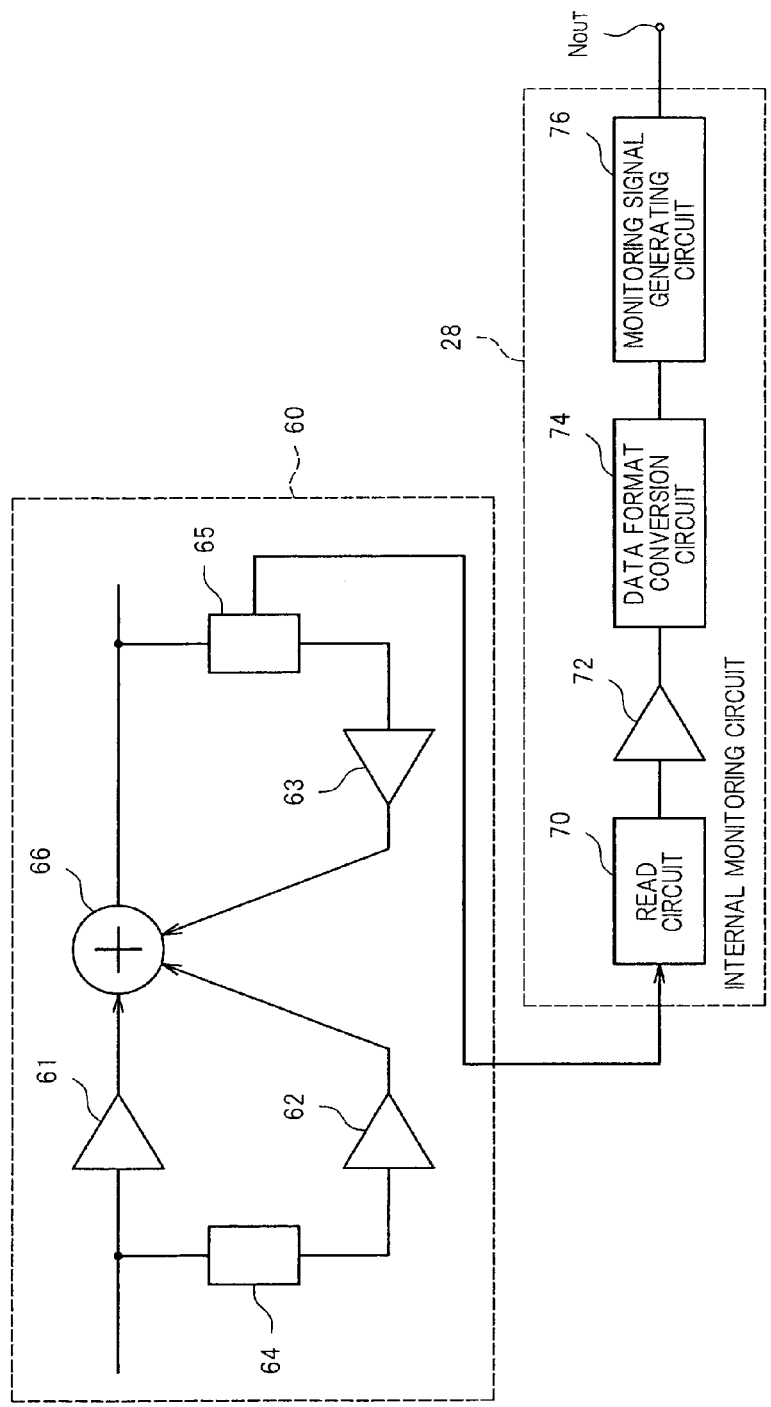
FIG. 3 is a schematic block diagram showing an example of the configuration of a digital filter used in the gyro-filter, and the configuration of an internal monitoring circuit.

FIG. 3 is a schematic block diagram showing an example of the configuration of the digital filter used in the gyro-filter 24, and the configuration of the internal monitoring circuit 28. A digital filter 60 is a first-order IIR filter, and comprises multipliers 61, 62, 63, delay circuits 64, 65, and an adder 66. The multiplier 61 multiplies the floating-point format input data by a factor set in the register or the like, and feeds the results to the adder 66. The multiplier 62 multiplies the floating-point format input data delayed by the delay circuit 64 by a factor set in the register or the like, and feeds the results to the adder 66. For the output of the adder 66, the multiplier 63 multiplies the floating-point format data delayed by the delay circuit 65 by a factor set in the register or the like, and feeds the results to the adder 66. The adder 66 adds together the outputs of the multipliers 61 to 63 and outputs the result.

It is possible to set the upper limit and the lower limit of the computation range of the digital filter 60. Generally, the absolute value of the data within the digital filter 60 does not reach the maximum numerical value expressable in floating-point format when camera shake is controlled. Furthermore, for example, when the results of the values calculated by the integration circuit 44 are extremely large, more time will be required to return to a state in which normal vibration-compensating data can be obtained, and less control can be maintained with regard to camera shake response. Accordingly, when the absolute value of the computed data surpasses a predetermined threshold value, the digital filter of the present system replaces the computed data with a predetermined upper limit value. When the absolute value of the computed data is, for example, too small to be expressed by the DAC 26 or the like, the computed data is replaced by 0. The threshold value and upper limit value used in these processes are set in advance in the register or the like.

The replacing of data with an upper limit or lower limit can be performed by, e.g., the adder 66. When the exponent of the floating-point format data resulting from the calculations exceeds a predetermined threshold value Th1, the adder replaces the calculation results with an upper limit value.

Conversely, when the exponent is less than a predetermined threshold value Th2 (Th2<Th1), the adder replaces the calculation results with 0.

Next, the internal monitoring circuit 28 will be described. The delay circuits 64, 65 of the digital filter 60 are storage means capable of holding internal computation data during time corresponding to the amount of delay; and are configured using a register, memory, or the like. The internal monitoring circuit 28 has, for example, a read circuit 70 for accessing the delay circuit 65 and reading the data held therein. The read circuit 70 can be made capable of switching the data of any of the plurality of filters in the gyro-filter 24 to be monitored. The internal monitoring circuit 28 further comprises a multiplier 72, a data-format conversion circuit 74, and a monitoring signal generating circuit 76.

The multiplier 72 is gain-adjusting means for multiplying the internal computation data obtained by the read circuit 70 by a preset gain, and adjusting the amplitude of the internal computation data. For example, it is possible for the gain to be set in a register, and the user to rewrite the register data via an interface leading to an external circuit.

The data-format conversion circuit 74 converts the internal computation data outputted by the multiplier 72 from floating-point format to fixed-point format.

The monitoring signal generating circuit 76 generates an internal monitoring signal for expressing the internal computation data in an analog amount, on the basis of the internal computation data converted to fixed-point format by the data-format conversion circuit 74. The monitoring signal generating circuit 76 is, for example, a DAC; and outputs as the monitoring signal a signal having an analog voltage corresponding to the fixed-point format data. The generated monitoring signal is fed to a signal monitoring device connected to the output terminal $N_{OUT}$. The signal monitoring device can display the received monitoring signal on a display unit in a waveform display, and, based on the display, the user can examine the internal state of the digital filter 60 and get a general representation thereof.

There are also cases in which the signal monitoring device corresponds to a PWM signal monitor. The monitoring signal generating circuit 76 associated with a signal monitoring device of this type may be a PWM circuit. In this case, the monitoring signal generating circuit 76 outputs as the internal monitoring signal a PWM signal for modulating a pulse width that is an analog amount, in accordance with the inputted fixed-point format data.

DAC and PWM circuits are generally compatible with fixed-point format data because they have relatively simple circuit configurations. However, fixed-point format data has a smaller range of numerical values available than floating-point format data. As a result, when the floating-point format internal computation data in the gyro-filter 24 is directly converted to fixed-point format, there is the possibility of overflow, and the internal state cannot be accurately monitored. Accordingly, in the present system, the multiplier 72 is provided upstream of the data-format conversion circuit 74, and gain adjustment is made possible. The user adjusts the gain of the multiplier 72 on the basis of the display on the signal monitoring device, and the analog amount corresponding to the internal computation data can be kept within the dynamic range of the DAC or PWM circuit. The dynamic range of the signal monitoring device can also be effectively used for observation.

It is also possible to use the output format conversion circuit 48 of the gyro-filter 24 as the data-format conversion circuit 74. The monitoring signal generating circuit 76 can also be configured using the DAC 26.

In the embodiment of the present invention, the gyro-sensor 12, the Hall element 10, and the VCM 14 are used, respectively, to detect camera shake, detect the position of the lens 8, and drive the lens 8; however, the present application is not limited to this configuration. For example, a stepping motor or a piezoelectric element can be used as the element for driving the lens 8. When a stepping motor is used, the Hall filter 22 computes the servo data $D_{SV}$ using the vibration-compensating data $D_S$ and not the position data $D_P$ based on the Hall element 10. It is also possible to adopt a configuration in which a sensor for detecting the acceleration in the linear direction is used to detect the vibration of the image-capturing device on the basis of an acceleration signal.

For example, when a PWM signal is generated in order to drivably control the stepping motor or the like, the PWM circuit intended for this purpose can also act as the monitoring signal generating circuit 76.

The embodiment of the present invention is based on a lens shift scheme for driving a lens and correcting the camera shake, but not by way of limitation to the invention. For example, the invention can also be applied to an image sensor shift scheme for shifting a CCD image sensor or other image sensor in accordance with the shaking of the image-capturing device. In this case, the position of the image sensor is detected by the sensor, and the image sensor is displaced by an actuator.

According to the present invention, and as described in the above embodiment, a digital filter for performing calculations in floating-point format is used in the vibration-compensation-data-generating circuit to perform a process for generating fixed-point format vibration-compensation data from the inputted fixed-point format displacement velocity data. Overflow within the vibration-compensation-data-generating circuit is thereby prevented, and even small data can be expressed with high accuracy. Therefore, the vibration-compensation data is reliably accurate, and image stabilization can be suitably performed.

What is claimed is:

1. An image stabilization control circuit for driving an image stabilization mechanism of an image-capturing device on the basis of a displacement velocity of the image-capturing device detected by a vibration detector provided to the device, the image stabilization control circuit comprising:

a vibration-compensation-data-generating circuit for generating vibration-compensation data corresponding to a degree to which the image-capturing device is displaced, on the basis of displacement velocity data corresponding to the displacement velocity; and a drive-signal-generating circuit for generating a drive signal for driving the image stabilization mechanism, on the basis of the vibration-compensation data outputted from the vibration-compensation-data-generating circuit; wherein the vibration-compensation-data-generating circuit comprises an input format conversion circuit for converting the displacement velocity data from fixed-point format to floating-point format;

a high-pass filter that is a digital filter for performing a filtering process for attenuating a low-frequency component and transmitting a vibration component of a target compensation region, on the floating-point format displacement velocity data;

an integration circuit that is a digital filter for performing an integration process on data outputted by the high-pass filter, and generating the vibration-compensation data; and an output format conversion circuit for converting the vibration-compensation data obtained by the integration circuit from floating-point format to fixed-point format, and outputting the vibration-compensation data from the vibration-compensation-data-generating circuit.

2. The image stabilization control circuit of claim 1, wherein the vibration-compensation-data-generating circuit has a centering high-pass filter that is a digital filter provided between the integration circuit and the output format conversion circuit, the filter performing a filtering process for damping a direct current component of the floating-point format vibration-compensation data.

3. The image stabilization control circuit of claim 2, wherein the drive-signal-generating circuit generates the drive signal on the basis of position data indicating a degree to which the image stabilization mechanism is displaced, and the vibration-compensation data.

4. The image stabilization control circuit of claim 1, wherein the vibration-compensation-data-generating circuit replaces the floating-point format data within the circuit with 0 when an absolute value of the data is equal to or less than a predetermined threshold.

5. The image stabilization control circuit of claim 1, wherein the vibration-compensation-data-generating circuit replaces the floating-point format data within the circuit with a predetermined upper limit value when an absolute value of the data is equal to or greater than a predetermined threshold.

6. The image stabilization control circuit of claim 1, wherein the image stabilization control circuit comprises:

means for reading out floating-point format internal computation data within the vibration-compensation-data-generating circuit;

gain-adjusting means for multiplying, by a preset gain, the internal computation data that has been read out, and adjusting an amplitude of the internal computation data;

data format conversion means for converting the adjusted-amplitude internal computation data from floating-point format to fixed-point format;

monitoring signal generating means for generating an internal monitoring signal for expressing the internal computation data in an analog amount, on the basis of the internal computation data converted to fixed-point format; and an output terminal for outputting the internal monitoring signal to a circuit externally disposed with respect to the image stabilization control circuit.

7. An image-capturing device, comprising:

the image stabilization control circuit of claim 1;

a vibration detector for detecting a displacement velocity and feeding the displacement velocity to the image stabilization control circuit; and an image stabilization mechanism driven by the drive signal generated by the image stabilization control circuit, the image stabilization mechanism having a displaceable lens or image sensor that is to be driven.

* * * * *